(12) United States Patent
Yoshida

(10) Patent No.: US 9,308,438 B2
(45) Date of Patent: Apr. 12, 2016

(54) JIGSAW PUZZLE AND MANUFACTURING METHOD THEREOF

(75) Inventor: Katsuhisa Yoshida, Tokyo (JP)

(73) Assignee: GATEWAY ARCH INC., Tokyo (JP)

( * ) Notice: Subject to any disclaimer, the term of this patent is extended or adjusted under 35 U.S.C. 154(b) by 34 days.

(21) Appl. No.: 14/123,463

(22) PCT Filed: Jun. 1, 2012

(86) PCT No.: PCT/JP2012/064324
§ 371 (c)(1),
(2), (4) Date: Apr. 24, 2014

(87) PCT Pub. No.: WO2012/165631
PCT Pub. Date: Dec. 6, 2012

(65) Prior Publication Data
US 2014/0246832 A1    Sep. 4, 2014

(30) Foreign Application Priority Data
Jun. 3, 2011 (JP) ................. 2011-125358

(51) Int. Cl.
*A63F 9/10* (2006.01)
*B32B 27/08* (2006.01)
*B32B 27/30* (2006.01)
*B32B 27/32* (2006.01)
(Continued)

(52) U.S. Cl.
CPC ... *A63F 9/10* (2013.01); *B32B 3/06* (2013.01); *B32B 27/08* (2013.01); *B32B 27/302* (2013.01); *B32B 27/304* (2013.01); *B32B 27/32* (2013.01); *B32B 27/36* (2013.01); *A63F 2009/1072* (2013.01); *A63F 2009/1083* (2013.01); *B32B 2274/00* (2013.01); *B32B 2307/412* (2013.01); *B32B 2307/51* (2013.01)

(58) Field of Classification Search
CPC .............. A63F 9/10; A63F 2009/1005; A63F 2009/1072; A63F 2009/1083; A63F 2009/1088
See application file for complete search history.

(56) References Cited

U.S. PATENT DOCUMENTS 3,174,893 A * 3/1965 Church et al. ................. 108/161
4,824,112 A * 4/1989 Roy ........................... 273/157 R
(Continued)

FOREIGN PATENT DOCUMENTS

JP      59-037219 B2    9/1984
JP      01-056907 B2    12/1989
(Continued)

OTHER PUBLICATIONS

Machine translation of JP 2006-055290 (Yugen), pp. 1-9, retrieved on Mar. 18, 2015.*
(Continued)

*Primary Examiner* — Steven Wong
(74) *Attorney, Agent, or Firm* — Westerman, Hattori, Daniels & Adrian, LLP

(57) ABSTRACT

To provide a jigsaw puzzle that is manufactured easily and conveniently in a short time and allows reduction in production costs, and a method of manufacturing the same. A jigsaw puzzle obtained by stamping out a laminated sheet of a plurality of synthetic resin sheets with a stamping blade to be divided into a plurality of small pieces, wherein the laminated sheet is formed of: a soft sheet of a soft synthetic resin having a sheet shape formed by extrusion molding; and a hard sheet of a synthetic resin that is harder than the soft sheet and is bonded to the soft sheet.

4 Claims, 9 Drawing Sheets

(51) Int. Cl.
  *B32B 27/36* (2006.01)
  *B32B 3/06* (2006.01)

(56) References Cited

U.S. PATENT DOCUMENTS

| | | | | |
|---|---|---|---|---|
| 5,257,785 | A * | 11/1993 | Sugie | 273/157 R |
| 6,086,067 | A * | 7/2000 | Benoit et al. | 273/157 R |
| 6,141,851 | A * | 11/2000 | Reinbold, Jr. | 29/412 |
| 7,677,568 | B1 * | 3/2010 | Kurtz | 273/157 R |
| 2002/0093137 | A1 * | 7/2002 | Enko | 273/150 |
| 2002/0105138 | A1 * | 8/2002 | Juenger | 273/157 R |
| 2003/0191227 | A1 * | 10/2003 | Grove et al. | 524/494 |
| 2010/0194041 | A1 * | 8/2010 | Salgado | 273/157 A |
| 2014/0070488 | A1 * | 3/2014 | Hanstein | 273/156 |
| 2014/0246832 | A1 * | 9/2014 | Yoshida | 273/156 |

FOREIGN PATENT DOCUMENTS

| | | |
|---|---|---|
| JP | 3047284 U | 4/1998 |
| JP | 2006-055290 A | 3/2006 |
| JP | 2010-060737 A | 3/2010 |

OTHER PUBLICATIONS

Machine translation of JP 3047284 (Kabushiki), pp. 1-12, retrieved on Mar. 18, 2015.*

Machine translation of JP 2010/060737 (Nobumasa), pp. 1-12, retrieved on Mar. 18, 2015.*

International Search Report of PCT/JP2012/064324, mailing date of Sep. 4, 2012.

* cited by examiner

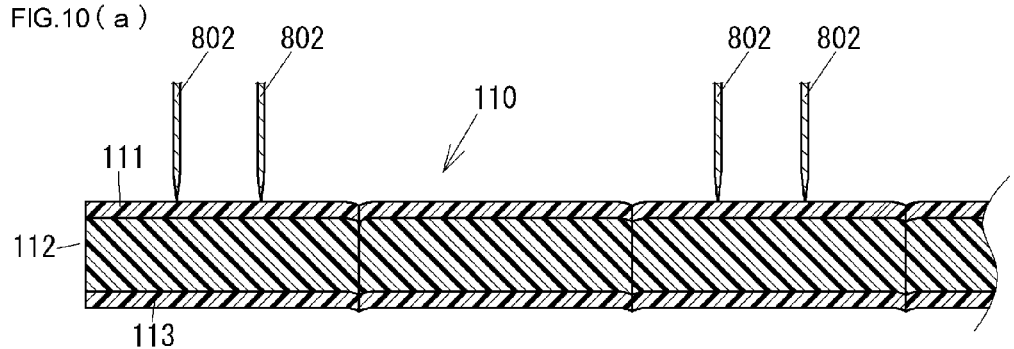
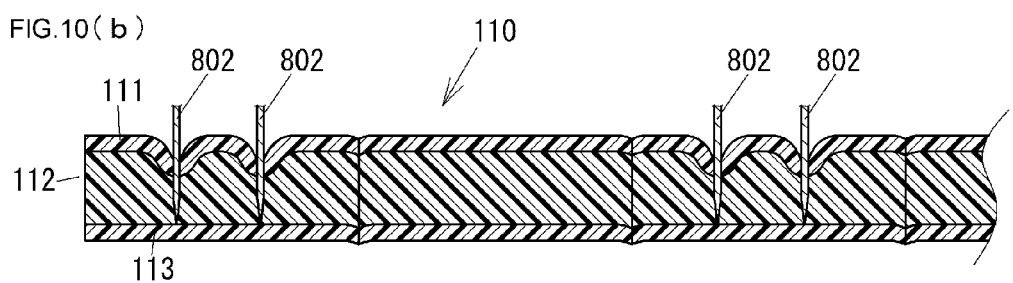
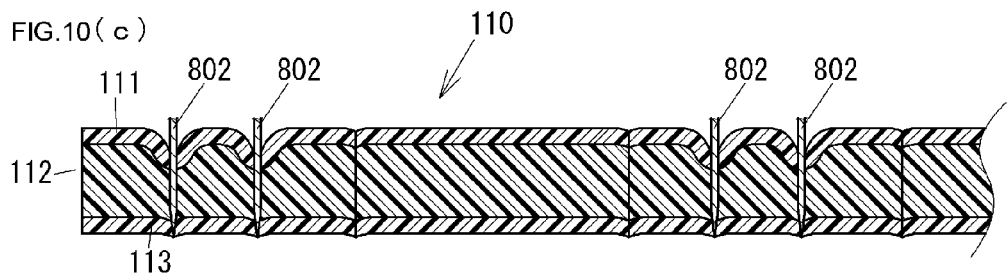
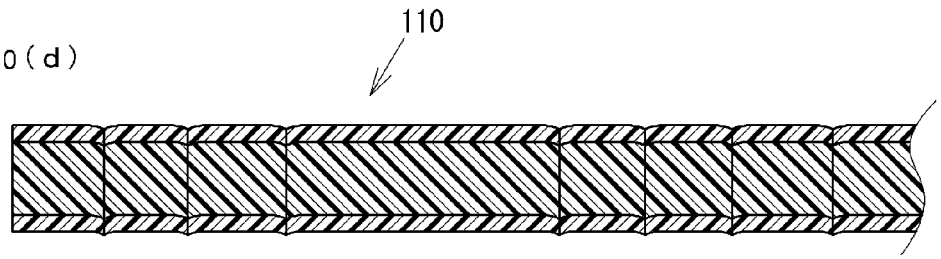

JIGSAW PUZZLE AND MANUFACTURING METHOD THEREOF

TECHNICAL FIELD

The present invention relates to a jigsaw puzzle and a manufacturing method thereof. More specifically, the present invention relates to a jigsaw puzzle formed of a synthetic resin laminate and a manufacturing method thereof.

BACKGROUND ART

Jigsaw puzzles are formed by dividing a flat plate such as a flat paper sheet into multiple pieces onto which patterns of paintings, photographs, graphics, symbols, letters, characters and the like are drawn. Jigsaw puzzles are a toy which is enjoyed by assembling discrete pieces together to restore the pattern. Each piece is a flat plate having a polygonal shape such as a quadrangular shape and having, on the side face thereof, a male or female engaging member with an approximately round shape. A male engaging member of a piece can be interlocked with a female engaging member of another neighbouring piece. A female engaging member of a piece is interlocked with a male engaging member of another neighbouring piece.

The neighbouring pieces are formed so that the male engaging member fits the female engaging member. All pieces are formed so as to respectively have slightly different shapes and so that there are no two pieces having completely the same shape. According to this, a piece can be interlocked with only neighbouring pieces. Jigsaw puzzles are formed by drawing patterns on relatively thick flat materials mainly including paper, cork, wood and the like. Recently, jigsaw puzzles made of synthetic resins have been manufactured which have sharper patterns that are reminiscent of stained glass and the like.

Jigsaw puzzles are required to have a certain thickness in order to maintain the assembled state. Base sheets made of synthetic resins which form jigsaw puzzles need to have a thickness of 1.0 to 2.0 mm or more. However, it is difficult to continuously print patterns by currently available printing machines on base sheets that are 1.0 to 2.0 mm or more in thickness. Base sheets having a thickness of 1.0 to 2.0 mm or more are also difficult to be taken up onto rolls by winding devices. Accordingly it is also difficult to continuously print by web-fed printing machines. Conventional base sheets are laminates containing a flat sheet having the dimensions of the completed jigsaw puzzle as well as a certain thickness and a thin film on which a pattern is printed, which are bonded together by means of an adhesive and the like.

The present applicant has proposed a jigsaw puzzle made of a synthetic resin which is manufactured by printing on a hard sheet having a predetermined size on a sheet-fed offset printing machine, laminating the sheet with a soft flat sheet using an adhesive to obtain a puzzle substrate made of the synthetic resin having a thickness and stamping out the puzzle substrate into pieces on a stamping machine (see Patent Document 1). The puzzle substrate disclosed in Patent Document 1 is formed by bonding outer printed hard films on both sides of an inner soft sheet using an adhesive. The puzzle substrate is formed so that the inner soft sheet and outer hard films on both sides thereof are integrated and become a relatively thick single plate.

Pieces made of the synthetic resin disclosed in Patent Document 1 are not easily detached from one another when they are correctly assembled. Users can get, when they correctly interlock the pieces made of synthetic resins, a feeling that the pieces are a sure fit. In addition, the pieces made of synthetic resins which are correctly interlocked make a sound as if they are a sure fit, providing users with a sense of accomplishment as well as pleasurable sensation.

Patent Document 1: Japanese Patent Application Laid-open No. 2006-55290

However, the jigsaw puzzle disclosed in Patent Document 1 requires multiple steps for manufacturing, resulting in low workability and productivity. Specifically, multiple steps for manufacturing are required including the step of forming a puzzle substrate by uniformly applying an adhesive on an inner soft sheet formed to have a predetermined size depending on the size of a complete jigsaw puzzle; the step of forming a laminate by bonding, one by one, outer hard films having the size matching to the inner soft sheet before heating and pressing; and the step of pressing the formed laminate to form the puzzle substrate which is then stamped out on a stamping machine.

The jigsaw puzzle disclosed in Patent Document 1 requires separate bonding, one by one, of outer hard sheets having a matching size to the inner soft sheet having a certain size. The manufacturing method of the jigsaw puzzle disclosed in Patent Document 1 also requires uniform and even application of an adhesive, which is troublesome. The jigsaw puzzle disclosed in Patent Document 1 also requires uniform temperature of the plate and uniform application of pressure in order to uniformly set the adhesive, which are also troublesome. Thus the jigsaw puzzle disclosed in Patent Document 1 requires many troublesome working steps, resulting in high production costs. Namely, the jigsaw puzzle has such disadvantages that it has low workability and productivity, is not suitable for mass production and requires increased costs for production and manpower.

SUMMARY OF THE INVENTION

The present invention has been created in order to solve the above disadvantages of the prior art and accomplishes the following objectives: an objective of the present invention is to provide a jigsaw puzzle that is manufactured with a laminate bonded and produced by application of pressure without application of an adhesive. An object of the present invention is also to provide a jigsaw puzzle that is manufactured easily and conveniently in a short time and allows reduction in production and manpower costs. Another object of the present invention is to provide a method of manufacturing a jigsaw puzzle that is manufactured easily and conveniently in a short time and allows reduction in production and manpower costs.

The present invention which accomplishes the above objectives are as follows.

A jigsaw puzzle of the invention 1 is a jigsaw puzzle obtained by producing a base sheet by cutting, into a predetermined shape, a laminated sheet of a plurality of synthetic resin sheets and stamping out the base sheet with a stamping blade to be divided into a plurality of small pieces, wherein the laminated sheet is formed of: a soft sheet of a soft synthetic resin having a sheet shape formed by extrusion moulding; and a hard sheet of a synthetic resin that is harder than the soft sheet and is bonded to the soft sheet.

The jigsaw puzzle of the invention 2 is characterized in that, in the invention 1, the laminated sheet is obtained by applying pressure to the soft sheet in an uncured state before complete curing after the extrusion moulding and the hard sheet by means of a cylindrical pressure bonding roll in order to bond the sheets together.

The jigsaw puzzle of the invention 3 is characterized in that, in the invention 1 or 2, the hard sheet is formed of: a first hard sheet that is bonded to one face of the soft sheet; and a second hard sheet that is bonded to the other face of the soft sheet.

The jigsaw puzzle of the invention 4 is characterized in that, in the invention 3, at least one member selected from the soft sheet, the first hard sheet and the second hard sheet is a transparent or semi-transparent member allowing the passage of light.

The jigsaw puzzle of the invention 5 is characterized in that, in the invention 3 or 4, the first hard sheet and/or the second hard sheet has a pattern printed by a rotary printing machine.

The jigsaw puzzle of the invention 6 is characterised in that, in any one of the inventions 1 to 5, the soft sheet contains, as a main component, at least one thermoplastic synthetic resin selected from a polypropylene, a polyvinyl chloride, a polyethylene, a polystyrene and a polyethylene terephthalate, and as an auxiliary component, at least one thermoplastic elastomer selected from an olefin thermoplastic elastomer, a styrene thermoplastic elastomer and a polyester thermoplastic elastomer.

The jigsaw puzzle of the invention 7 is characterised in that, in the invention 6, the hard sheet contains, as a main component, at least one thermoplastic synthetic resin selected from a polypropylene, a polyvinyl chloride, a polyethylene, a polystyrene and a polyethylene terephthalate.

The jigsaw puzzle of the invention 8 is characterised in that, in any of the inventions 1 to 7, the plurality of small pieces elastically deform so as to be interlocked in close contact.

A method of manufacturing a jigsaw puzzle of the invention 9 is characterized in that the method includes a first step of extruding a molten synthetic resin into a sheet shape by extrusion moulding to produce a soft sheet; a second step of bonding, to the soft sheet, a hard sheet of a synthetic resin that is harder than the soft sheet to form a laminated sheet; a third step of cutting the laminated sheet to form a base sheet having a certain size; and a fourth step of stamping out the base sheet with a stamping blade to be formed into a plurality of small pieces.

The method of manufacturing the jigsaw puzzle of the invention 10 is characterized in that, in the invention 9, the laminated sheet in the second step is obtained by applying pressure to the soft sheet and the hard sheet by means of a cylindrical pressure bonding roll in order to bond the sheets together.

The method of manufacturing the jigsaw puzzle of the invention 11 is characterized in that, in the invention 10, the soft sheet in an uncured state before complete curing after the extrusion moulding is bonded to the hard sheet.

The method of manufacturing the jigsaw puzzle of the invention 12 is characterized in that, in the inventions 9 to 11, the hard sheet is formed of: a first hard sheet that is bonded to one face of the soft sheet; and a second hard sheet that is bonded to the other face of the soft sheet.

The method of manufacturing the jigsaw puzzle of the invention 13 is characterized in that, in the invention 12, at least one member selected from the soft sheet, the first hard sheet and the second hard sheet is a transparent or semi-transparent member allowing the passage of light.

The method of manufacturing the jigsaw puzzle of the invention 14 is characterized in that, in the invention 12 or 13, the first hard sheet and/or the second hard sheet has a pattern printed by a rotary printing machine.

The jigsaw puzzle and manufacturing method thereof of the present invention allow continuous production of jigsaw puzzles by cutting and stamping an extrusion moulded soft sheet to which a hard sheet is bonded and laminated only by applied pressure and thus allow mass production and reduction in costs. The jigsaw puzzle and manufacturing method thereof also requires easy and convenient production in a short time, allowing reduction in production and manpower costs.

BRIEF DESCRIPTION OF THE DRAWINGS

FIG. 10 is a partial section view showing the process for cutting the base sheet taken along line C-C in FIG. 9.

DESCRIPTION OF THE EMBODIMENTS

Figure 1:
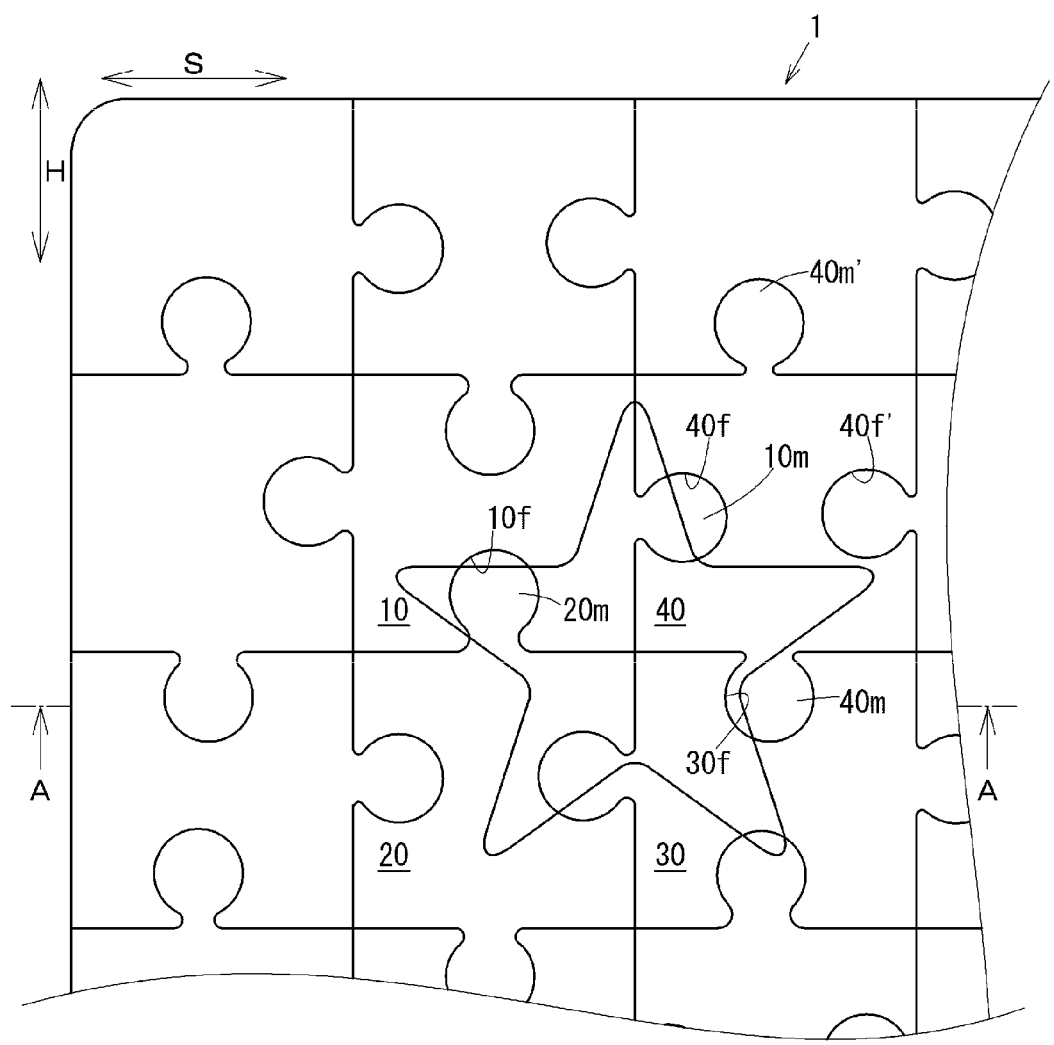
FIG. 1 is a partial front view of the jigsaw puzzle to which the present invention is applied.
Figure 2:
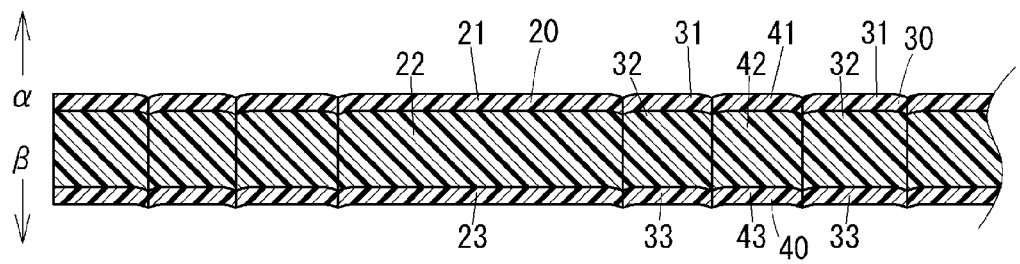
FIG. 2 is a partial section view taken along line A-A of FIG. 1.
Figure 3:
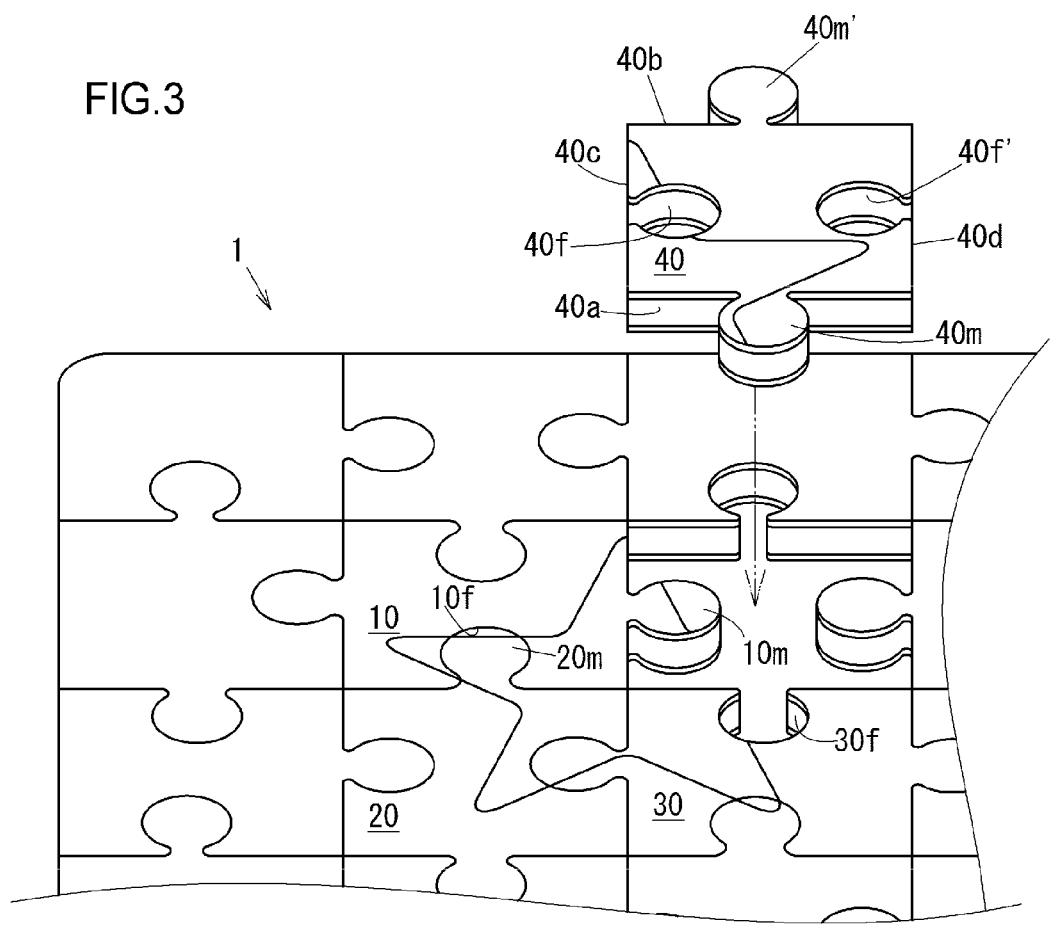
FIG. 3 is a partial external view showing the state when a piece 40 is disassembled from the state shown in FIG. 1.

The embodiments of the present invention are described by referring to the drawings. The descriptions on the embodiments of the present invention are made for some of a plurality of pieces of a jigsaw puzzle 1. FIG. 1 is a partial front view of the jigsaw puzzle to which the present invention is applied. FIG. 2 is a partial section view taken along line A-A of FIG. 1. FIG. 3 is a partial external view showing the state when a piece 40 is disassembled from the state shown in FIG. 1. FIG. 4 is an enlarged partial section view showing the course where a piece 40 is interlocked with a piece 30.

As shown in FIG. 1, the orientations of the arrows H and S are respectively designated by "vertical orientation" and "horizontal orientation". As shown in FIG. 2, the directions of the arrows α and β indicating the thickness direction of the jigsaw puzzle are designated by "upward" and "downward", respectively. The state where a piece is interlocked with other neighbouring piece(s) is designated by "assembled state". On the other hand, the state where a piece is not interlocked with any neighbouring piece is designated by "non-assembled state".

As shown in FIGS. 1 to 3, the jigsaw puzzle 1 is formed with a plurality of pieces. As shown in FIG. 1 or 2, the jigsaw puzzle 1 in the present embodiment is a single flat plate having a predetermined thickness in its assembled state where all the pieces are assembled. Each piece has a quadrangular shape with a predetermined thickness, i.e. a rectangular parallelepiped shape, and is provided with a male engaging member or a female engaging member. In the present embodiment, the rectangular parallelepiped shape of each piece has the vertical and horizontal size of about 13 mm×13 mm and a thickness of as thin as 1.0 mm.

As shown in FIG. 1 or 3, each piece is provided with a male engaging member (projected member) or a female engaging member (recessed member) on the side face of the piece in order to be connected to another piece. For example, a piece 40 has an approximately rectangular parallelepiped shape and is provided with two male engaging members 40*m* and 40*m*' and two female engaging members 40*f* and 40*f*' on the side face thereof. As shown in FIG. 3, the male engaging member 40*m* has an approximately cylindrical shape. The male engaging member 40*m* is provided outward from one side face 40*a* of the piece 40. A part of the peripheral wall of the male engaging member 40*m* is merged to a part of the side face 40*a*. The male engaging member 40*m*' is, similar to the male engaging member 40*m*, formed so as to project from one side face 40*b*.

As shown in FIG. 3, the female engaging member 40*f* is formed inward of the piece 40 from a given position on a side face 40*c* of the piece 40. The female engaging member 40*f* is a circular hole having an approximately round shape and penetrating from the surface to the reverse face of the piece 40. The female engaging member 40*f* is formed by cutting out one side face 40*c* of the piece 40 into a bay-like shape. The female engaging member 40*f*' is, similar to the female engaging member 40*f*, formed on one side face 40*d*.

As shown in FIG. 1, a male engaging member of one piece can be interlocked with a female engaging member of another piece. For example, a male engaging member 10*m* of a piece 10 can be interlocked with a female engaging member 40*f* of a neighbouring piece 40. Similarly, a female engaging member of one piece is interlocked with a male engaging member of another neighbouring piece. For example, a female engaging member 10*f* of the piece 10 is interlocked with a male engaging member 20*m* of a neighbouring piece 20.

The neighbouring pieces are formed so that a male engaging member fits a female engaging member. All pieces are formed so as to respectively have slightly different shapes and so that there are no two pieces having completely the same shape. Namely, non-neighbouring pieces are formed so that a male engaging member of one piece does not fit a female engaging member of another piece. The jigsaw puzzle is formed so that, when all pieces are correctly assembled, a pattern of paintings, photographs, graphics, characters and the like is completed. A user can complete the jigsaw puzzle 1 by assembling the pieces one by one with the help of the shape of the pieces or the pattern drawn on the pieces which are disassembled.

The pieces at the edges of the completed jigsaw puzzle do not have a male engaging member or a female engaging member on side faces corresponding to the edges. The pieces at four corners of the completed jigsaw puzzle do not have a male engaging member or a female engaging member on two side faces corresponding to the corners.

FIG. 2 is a section view taken along line A-A of FIG. 1 and is depicted schematically with a thickness for easy visual understanding. As shown in FIG. 2, each piece is formed with three layers of a first hard layer, a soft layer and a second hard layer. For example, pieces 20, 30 and 40 are respectively formed with first hard layers 21, 31 and 41, soft layers 22, 32 and 42 and second hard layers 23, 33 and 43. Each piece is formed so that the first hard layer, the soft layer and the second hard layer are laminated in this order from the upward to downward direction.

The material for the first hard layer and the second hard layer of each piece may be a thermoplastic synthetic resin such as a polypropylene, a polyvinyl chloride, a polyethylene, a polystyrene, a polyethylene terephthalate and the like. In the present embodiment, the first hard layer is formed of an elastically deformable polypropylene. The first hard layer is formed of a polypropylene thin film of about 0.1 mm. The first hard layer is harder than the soft layer. The first hard layer is provided with a pattern on the surface thereof including paintings, photographs, graphics, characters and the like. The pattern on the first hard layer is printed by a rotary offset printing machine or a rotary gravure printing machine. In the present embodiment, the first hard layer is provided with the pattern printed on the surface thereof. However, the pattern may be provided on the reverse face thereof.

The soft layer is a composition containing an elastically deformable thermoplastic synthetic resin and a thermoplastic elastomer. In the present embodiment, the soft layer is a composition containing a polypropylene and a thermoplastic olefin elastomer. The soft layer is formed of a sheet having a thickness of about 0.8 mm. The soft layer has a greater thickness than the first hard layer. The soft layer is softer than the first hard layer and the second hard layer. Namely, the soft layer is a composition containing a thermoplastic synthetic resin and a thermoplastic elastomer and thus is softer than the first hard layer or the second hard layer formed simply of a thermoplastic synthetic resin.

In the present embodiment, the second hard layer is formed of an elastically deformable polypropylene. The second hard layer is formed of a polypropylene thin film of about 0.1 mm. The second hard layer is harder than the soft layer. In the present embodiment, the second hard layer is not provided with a printed pattern. However, the second hard layer may be provided with a pattern printed on the surface or reverse face thereof.

In the present embodiment, the first hard layer, the soft layer and the second hard layer respectively have a colour having high transparency that allows the passage of light, although they may be at least partially transparent or semi-transparent. Each piece is an integrated laminate in which the first hard layer, the soft layer and the second hard layer are laminated in this order. Each piece is formed by forming an integrated laminate by applying pressure to a first hard layer 111, a soft layer 112 and a second hard layer 113 described hereinbelow on a pressure bonding roll and stamping the obtained laminate, a base sheet 110.

Each piece is formed so that the soft layer is sandwiched by the first hard layer and the second hard layer which is hard, and thus has less warps generated and can keep a rigid structure even with a low thickness. Each piece has the soft layer that is formed of a composition containing a polypropylene and a thermoplastic olefin elastomer and the first and second hard layers that are respectively formed of a polypropylene. As described, each piece is formed of the soft layer, the first hard layer and the second hard layer which are formed of similar members and therefore have preferable adhesiveness and are sufficiently integrated.

As shown in FIG. 1 or 3, the jigsaw puzzle 1 in the present embodiment is provided with a pattern of a star. The pattern of a star is printed by a rotary gravure printing machine. The pattern of a star is formed over the pieces 10, 20, 30 and 40. By assembling the pieces 10, 20, 30 and 40, the pattern of a star is formed.

As shown in FIG. 4, a side face of a piece and a peripheral wall of a male engaging member form, in a sectional view, a plurality of bows which rise and fall continuously (hereinafter it is referred to as "mountain range-like"). The side face of each first hard layer is bent in a bow shape from the edge of the surface through the edge of the reverse face of the first hard layer so as to protrude outward. The side face of the first hard layer is, in a sectional view, a face having a slope with a certain angle and certain dimensions, an arc or a parabola.

The side face of each soft layer is bent in a bow shape from the edge of the surface through the edge of the reverse face of the first hard layer so as to protrude outward. The side face of the soft layer is, in a sectional view, a face having a slope with a certain angle and certain dimensions, an arc or a parabola.

The side face of each second hard layer is bent in a bow shape from the edge of the surface through the edge of the reverse face of the second hard layer so as to protrude outward. The side face of the second hard layer is, in a sectional view, a face having a slope with a certain angle and certain dimensions, an arc or a parabola. As shown in FIG. 4, the side face of the piece 40a and the peripheral wall of the male engaging member 40m form a mountain range-like shape because the side faces of the first hard layer, the soft layer and the second hard layer respectively have a bow shape.

As shown in FIG. 4, the side face of the piece 40 and the peripheral wall of the male engaging member 40m form a mountain range-like shape. A first bow-shaped side face 41a that is a side face of a first hard layer 41 is bent in a bow shape from the edge of the surface through the edge of the reverse face of the first hard layer 41. In the present embodiment, the first bow-shaped side face 41a contains a drooped face, a sheared face and a burred face.

Figure 6:
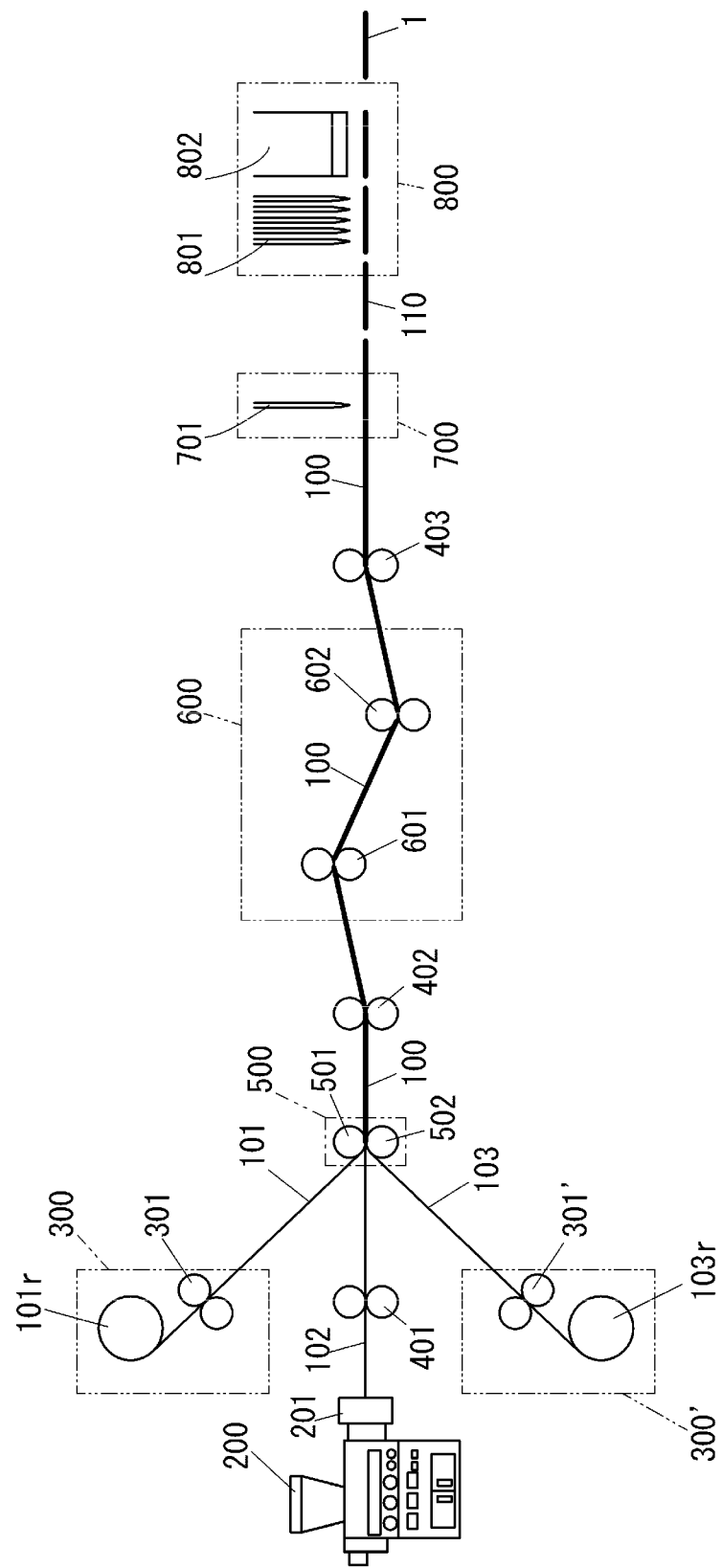
FIG. 6 is a diagrammatic view of a production line for manufacturing the jigsaw puzzle.
Figure 8:
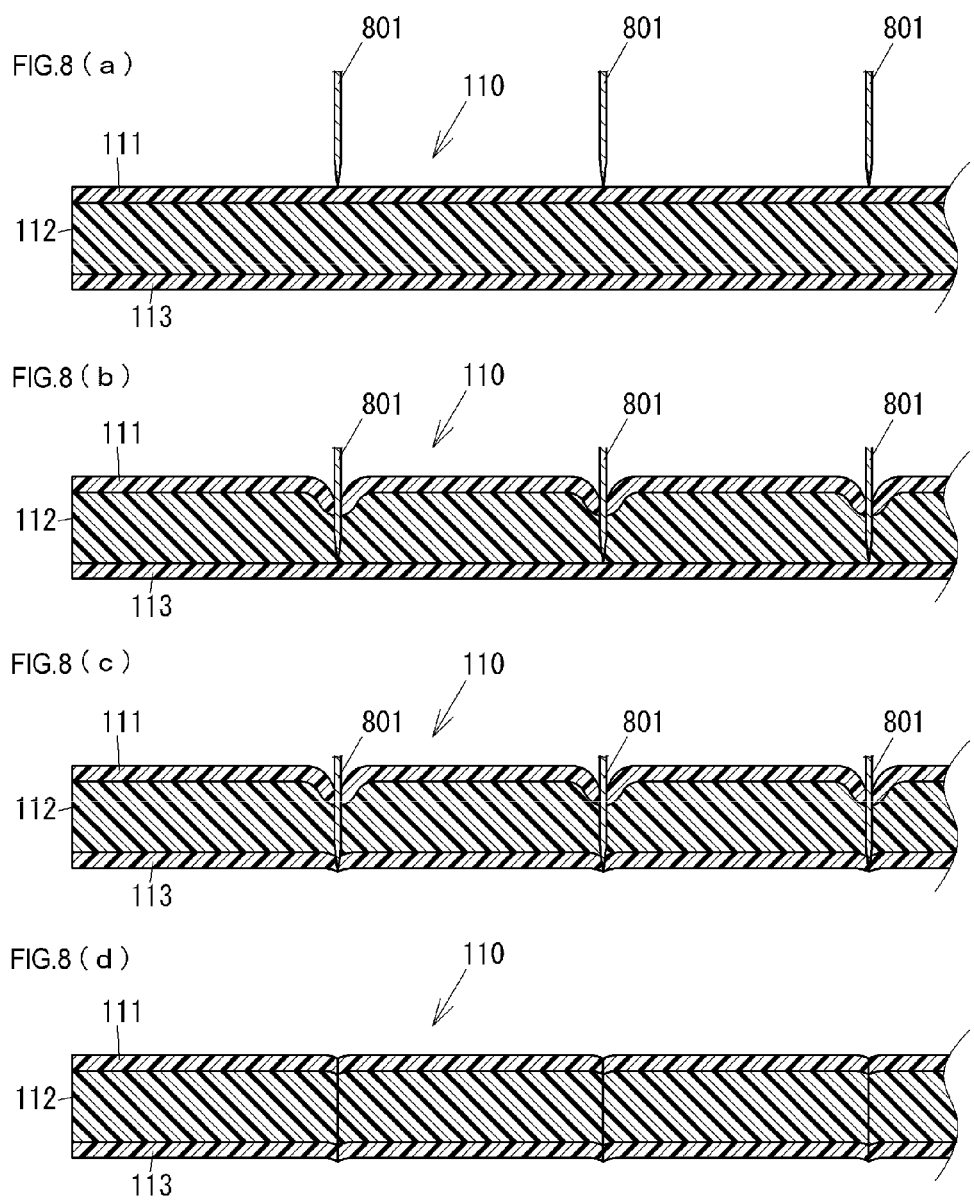
FIG. 8 is a partial section view showing the process for cutting the base sheet taken along line B-B in FIG. 7.

The drooped face is formed so as to be bent downward from the surface of each layer to form a bow shape. The sheared face is formed downward continuously from the drooped face. As shown in FIG. 6 or 8, the sheared face is formed when the edge of a stamping vertical blade 801 or a stamping horizontal blade 802 is buried. The sheared face is a smooth face formed by friction with a side face of the stamping vertical blade 801 or the stamping horizontal blade 802. The burred face is formed so as to protrude downward from the reverse face of each layer. The burred face is a face with burrs which is formed when the stamping vertical blade 801 or the stamping horizontal blade 802 penetrates through each layer.

The soft layer 42 has a second bow-shaped side face 42a which is also formed in a similar manner as the first bow-shaped side face 41a. The second hard layer 43 has a third bow-shaped side face 43a which is also formed in a similar manner as the first bow-shaped side face 41a. Each bow-shaped side face in the piece 40 is formed so as to slightly protrude outward from the contour of the surface of the piece 40.

As shown in FIG. 4, a side face of a piece 30 and an inner arc of a female engaging member 30f form a mountain range-like shape. A first hard layer 31 has a first bow-shaped side face 31a which is also formed in a similar manner as the first bow-shaped side face 41a. The soft layer 32 also has a second bow-shaped side face 32a which is formed in a similar manner as the second bow-shaped side face 42a. Further, the second hard layer 33 has a third bow-shaped side face 33a which is also formed in a similar manner as the third bow-shaped side face 43a. Each bow-shaped side face in the piece 30 is formed so as to slightly protrude outward from the contour of the surface of the piece 30.

Figure 4A:
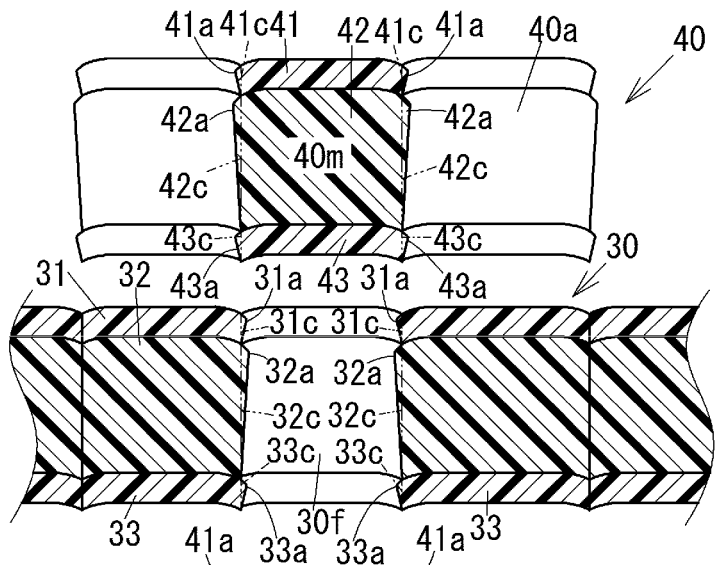
FIG. 4 is an enlarged partial section view showing the course where a piece 40 is interlocked with a piece 30.
Figure 4B:
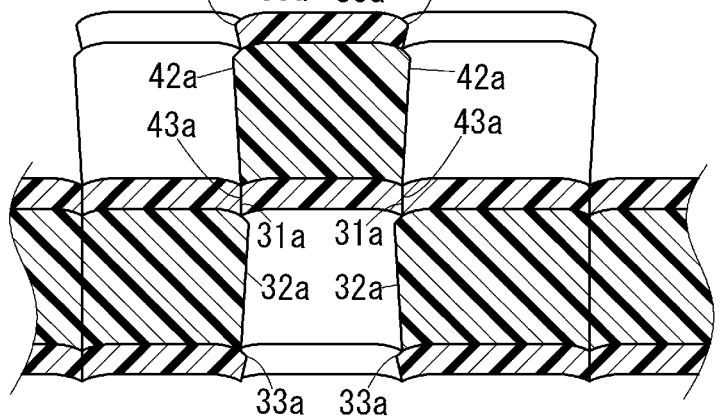
Figure 4C:
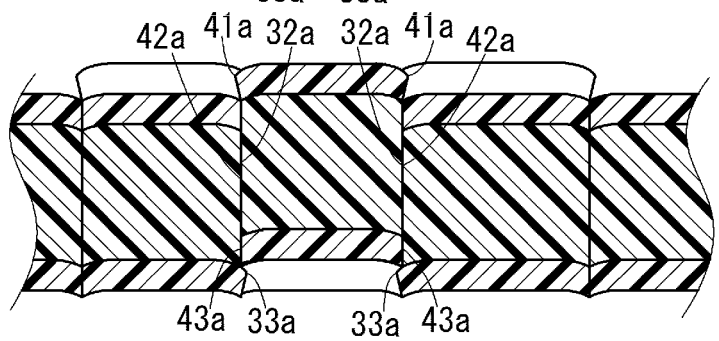
Figure 4D:
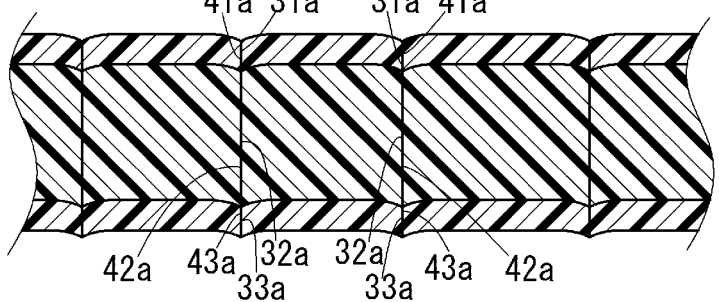

Each bow-shaped side face is formed so as to elastically deform when a force at or above a predetermined level is applied thereto. In an assembled state where one piece is interlocked with another neighbouring piece, both a side face of one piece and a side face of another neighbouring piece elastically deform resulting in close contact. For example, FIG. 4(d) shows the state where a male engaging member 40m of the piece 40 is interlocked with a female engaging member 30f of the piece 30. In the assembled state where the male engaging member 40m is interlocked with the female engaging member 30f, both the first bow-shaped side face 41a of the male engaging member 40m and the first bow-shaped side face 31a of the female engaging member 30f elastically deform resulting in close contact.

Both a second bow-shaped side face 42a and a second bow-shaped side face 32a elastically deform resulting in close contact. Further, both a third bow-shaped side face 43a and a third bow-shaped side face 33a elastically deform resulting in close contact. Supposed lines 41c, 42c and 43c shown in FIG. 4(a) show the positions of respective elastically deformed bow-shaped side faces when the male engaging member 40m and the female engaging member 30f are interlocked. For example, the supposed line 41c shows the position of the elastically deformed first bow-shaped side face 41a resulting in close contact to the first bow-shaped side face 31a when the male engaging member 40m and the female engaging member 30f are interlocked.

Similarly, the supposed lines 42c and 43c show the positions of the elastically deformed second bow-shaped side face 42a and third bow-shaped side face 43a. Supposed lines 31c, 32c and 33c show the positions of the elastically deformed first bow-shaped side face 31a, second bow-shaped side face 32a and third bow-shaped side face 33a. Each bow-shaped side face elastically deform up to the position of each supposed line when a force at or above a predetermined level is applied during the process of interlocking the male engaging member 40m with the female engaging member 30f. The male engaging member 40m and the female engaging member 30f come into the assembled state while the respective bow-shaped side faces elastically deform to be in close contact.

By referring to FIG. 4, the process where the male engaging member 40m and the female engaging member 30f of the piece 40 are interlocked is described hereinafter. First, a user compares discrete pieces and patterns on discrete pieces of the jigsaw puzzle 1 and look for the pieces neighbouring each other. As shown in FIG. 4(a), the user confirms that one male engaging member 40m of the piece 40 can be interlocked with one female engaging member 30f of the piece 30 and then align the reverse face of the male engaging member 40m with an opening of the female engaging member 30f.

While the reverse face of the male engaging member 40m is aligned with the opening of the female engaging member 30f, the male engaging member 40m is pushed downward. As shown in FIG. 4(b), when the male engaging member 40m is pushed, the third bow-shaped side face 43a comes into contact with the first bow-shaped side face 31a and elastically deforms at or above a predetermined level of force. At the same time, the first bow-shaped side face 31a also elastically deforms. Namely, the third bow-shaped side face 43a elastically deforms up to the position of the supposed line 43c shown in FIG. 4(a). The first bow-shaped side face 31a elastically deforms up to the position of the supposed line 31c shown in FIG. 4(a). As shown in FIG. 4(b), the elastically deformed third bow-shaped side face 43a and first bow-shaped side face 31a are in close contact.

As shown in FIG. 4(b), the male engaging member 40m is pushed further downward from the state where the third bow-shaped side face 43a and the first bow-shaped side face 31a are in close contact. As shown in FIG. 4(c), when the male engaging member 40m is pushed, the third bow-shaped side face 43a comes into contact with the second bow-shaped side face 32a and elastically deforms at or above a predetermined level of force. At the same time, the second bow-shaped side face 32a also elastically deforms. The second bow-shaped side face 42a comes into contact with the second bow-shaped side face 32a and the first bow-shaped side face 31a and elastically deforms at or above a predetermined level of force. At the same time, the second bow-shaped side face 32a and the first bow-shaped side face 31a also elastically deform. Namely, the third bow-shaped side face 43a elastically deforms up to the position of the supposed line 43c shown in FIG. 4(a). The first bow-shaped side face 31a also elastically deforms up to the position of the supposed line 31c shown in FIG. 4(a). Further, the second bow-shaped side face 32a elastically deforms up to the position of the supposed line 32c shown in FIG. 4(a).

As shown in FIG. 4(c), the male engaging member 40m is further pushed downward from the state where the third bow-shaped side face 43a and the second bow-shaped side face 32a are in close contact and the second bow-shaped side face 42a is in close contact with the second bow-shaped side face 32a and the first bow-shaped side face 31a. As shown in FIG. 4(d), when the male engaging member 40m is pushed, the third bow-shaped side face 43a comes into contact with the third bow-shaped side face 33a and elastically deforms at or above a predetermined level of force. At the same time, the third bow-shaped side face 33a also elastically deforms.

The second bow-shaped side face 42a comes into contact with the second bow-shaped side face 32a and elastically deforms at or above a predetermined level of force. At the same time, the second bow-shaped side face 32a also elastically deforms. The first bow-shaped side face 41a comes into contact with the first bow-shaped side face 31a and elastically deforms at or above a predetermined level of force. At the same time, the first bow-shaped side face 31a also elastically deforms. Namely, the third bow-shaped side face 43a elastically deforms up to the position of the supposed line 43c shown in FIG. 4(a). The first bow-shaped side face 31a also elastically deforms up to the position of the supposed line 31c shown in FIG. 4(a). Further, the second bow-shaped side face 32a elastically deforms up to the position of the supposed line 32c shown in FIG. 4(a).

As described above, the piece 40 and the piece 30 in the assembled state are difficult to be detached from one another because the first bow-shaped side faces, the second bow-shaped side faces and the third bow-shaped side faces respectively elastically deform resulting in close contact therebetween. Other pieces are also formed similarly. Therefore, when the jigsaw puzzle 1 is completed, every piece is in close contact with neighbouring pieces, making it difficult to be detached. The jigsaw puzzle 1 therefore can be contained in a panel and the like for display without gluing. The supposed lines show the positions of the respective elastically deformed bow-shaped side faces. However, these positions of the supposed lines are merely examples and it is needless to say that these positions may vary according to the force applied to the pieces in the assembled state.

[Method 1 for Manufacturing Jigsaw Puzzle]

Figure 5:
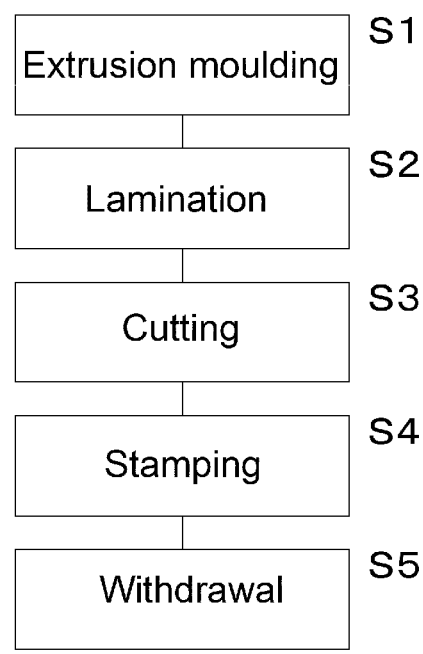
FIG. 5 is a flowchart showing manufacturing steps of the jigsaw puzzle according to the method 1 for manufacturing the jigsaw puzzle.
Figure 7:
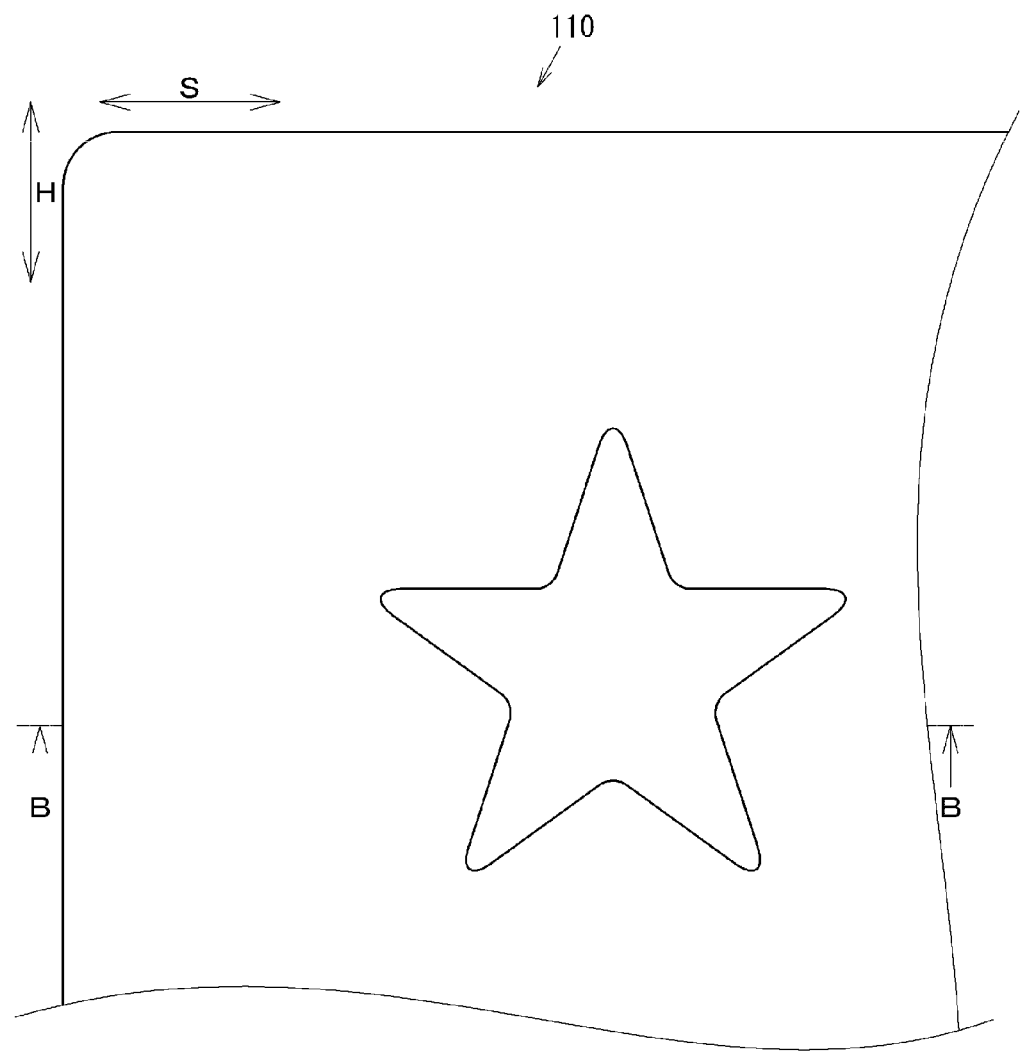
FIG. 7 is a partial plan view of a base sheet.
Figure 9:
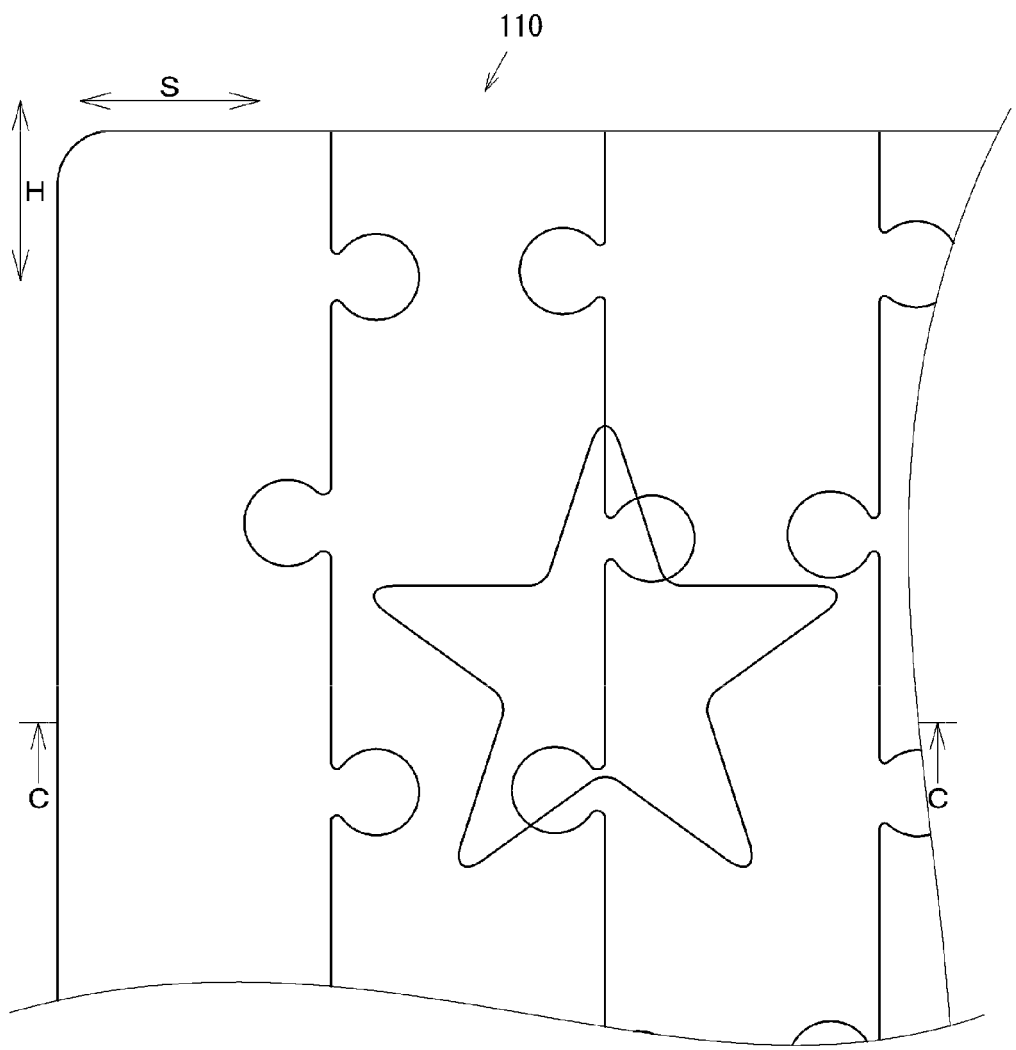
FIG. 9 is a partial plan view of the base sheet which has been cut.

The method 1 for manufacturing the jigsaw puzzle of the present invention is hereinafter described by referring to the drawings. FIG. 5 is a flow chart showing manufacturing steps of the jigsaw puzzle according to the method 1 for manufacturing the jigsaw puzzle. FIG. 6 is a diagrammatic view of a production line for manufacturing the jigsaw puzzle. FIG. 7 is a partial plan view of a base sheet. FIG. 8 is a partial section view showing the process for cutting the base sheet taken along line B-B in FIG. 7. FIG. 9 is a partial plan view of the base sheet which has been cut. FIG. 10 is a partial section view showing the process for cutting the base sheet taken along line C-C in FIG. 9.

The manufacturing steps are described in outline according to the flow chart shown in FIG. 5. A soft sheet 102 is extrusion moulded on an extrusion moulding machine 200 (S1). A first hard sheet 101, the soft sheet 102 and a second hard sheet 103 are laminated to produce a laminated sheet 100 (S2). The laminated sheet 100 is cut to produce a base sheet 110 (S3). The base sheet 110 is stamped to produce a jigsaw puzzle 1 (S4). The jigsaw puzzle 1 is withdrawn (S5). Through the above manufacturing steps, the jigsaw puzzle 1 is completely manufactured. The manufacturing method is now specifically described.

The devices required for manufacturing of the jigsaw puzzle are described by referring to the diagrammatic view in FIG. 6. In the present embodiment, the jigsaw puzzle 1 is manufactured by using an extrusion moulding machine 200, feeding devices 300 and 300', take-up rolls 401, 402 and 403, a pressing device 500, an adjusting device 600, a cutting devise 700 and a stamping machine 800.

The extrusion moulding machine 200 is to mould a soft sheet 102 which serves as soft layers of the pieces of the jigsaw puzzle 1. The feeding device 300 is to wind off a first roll 101r on which a first hard sheet 101 has been taken up. The feeding device 300' is to wind off a second roll 103r onto which a second hard sheet 103 has been taken up. Take-up rolls 401, 402 and 403 are to take up the respective sheets.

The pressing device 500 is to produce a laminated sheet 100 by laminating the first hard sheet 101, the soft sheet 102 and the second hard sheet 103. The adjusting device 600 is to adjust the thickness of the laminated sheet 100 and to eliminate warps. The cutting device 700 is to cut the laminated sheet 100 according to a predetermined size to produce a base sheet 110. The stamping machine 800 is to stamp out the base sheet 110 into pieces to produce the jigsaw puzzle 1.

The steps for manufacturing the jigsaw puzzle 1 are specifically described by referring to the diagrammatic view depicted in FIG. 6.

<Extrusion Moulding (S1)>

The step of extrusion moulding is a step of producing the soft sheet on the extrusion moulding machine 200. The material for the soft sheet 102 is mainly a thermoplastic synthetic resin and a thermoplastic elastomer. The thermoplastic synthetic resin which is used is at least one of a polyvinyl chloride, a polypropylene, a polyethylene, a polystyrene, a polyethylene terephthalate and the like. The thermoplastic elastomer exhibits rubber elasticity at an ordinary temperature and can be plasticized and moulded at a high temperature similar to thermoplastic resins. The thermoplastic elastomer which is used is at least one of an olefin thermoplastic elastomer, a styrene thermoplastic elastomer and a polyester thermoplastic elastomer.

In the present embodiment, to the extrusion moulding machine 200 is supplied a thermoplastic resin composition including a polypropylene and a thermoplastic olefin elastomer. The polypropylene and the thermoplastic elastomer may be appropriately formulated depending on the hues, patterns, hardness and the like of the jigsaw puzzle. The composition is then melted in a heating cylinder, kneaded, extruded by means of a screw and provided with a sheet shape in a die 201 at the tip to be moulded.

The thermoplastic elastomer may be, other than an olefin elastomer, a styrene elastomer or a polyester elastomer. For example, the thermoplastic olefin elastomer may be Thermorun or Zelas of Mitsubishi Chemical Corporation. The thermoplastic styrene elastomer may be Rabalon of Mitsubishi Chemical Corporation. The thermoplastic polyester elastomer may be Primalloy of Mitsubishi Chemical Corporation.

The soft sheet 102 is moulded in the extrusion moulding machine 200 in an uncured state immediately after extrusion such that it is nearly solid but is not completely cured. The soft sheet 102 is moulded into a transparent sheet. The soft sheet 102 is extruded when it is at about 250° C. The soft sheet 102 is formed into a sheet having a predetermined thickness (e.g. 0.8 mm) and a predetermined width (e.g. 1200 mm) on a pressure extension roll. The soft sheet 102 is taken up onto the take-up roll 401 and travels to the pressing device 500.

The take-up roll 401 contains a driving roll which is rotary driven and a nip roll (which may be rotary driven or may rotate dependently to the driving roll without being rotary driven). The take-up rolls 402 and 403 described below also have similar structures. The soft sheet 102 travels to the pressing device 500 while it is in the uncured state. The soft sheet 102 travels to the pressing device 500 when it is in a temperature range of about 150 to 160° C. Namely, the soft sheet 102 has, during travel to the pressing device 500, lower temperature than that of the soft sheet 102 immediately after extrusion from the extrusion moulding machine 200. The soft sheet 102 is spontaneously cooled during travel from the extrusion moulding machine 200 to the pressing device 500.

As shown in FIG. 6, the soft sheet 102 travels from the extrusion moulding machine 200 to the pressing device 500 by means of one take-up roll 401. However, it is needless to say that the soft sheet 102 may travel by means of a plurality of take-up rolls. For example, a plurality of take-up rolls may be provided upward and downward between the extrusion moulding machine 200 and the pressing device 500. The soft sheet 102 can be cooled within a short distance by passing through a plurality of take-up rolls provided upward and downward in a staggered manner.

<Lamination (S2)>

The step of lamination is a step of laminating the first hard sheet 101, the soft sheet 102 and the second hard sheet 103 to produce the laminated sheet 100 on the pressing device 500. The first hard sheet 101 is a transparent film onto which a pattern is printed. The transparent film is of an elastically deformable polypropylene and is a thin film of about 0.1 mm. The first hard sheet 101 is prepared to have the same width (e.g. 1200 mm) as the soft sheet 102. The first hard sheet 101 is the transparent film onto which a predetermined pattern in printed by a rotary gravure printing machine. The first hard sheet 101 has a plurality of identical patterns printed thereon with predetermined intervals in the longitudinal direction.

The first hard sheet 101 has the patterns on one face. The first hard sheet 101 having been provided with the printed patterns is taken up by a winding device onto the first roll 101r. The first roll 101r is set in the feeding device 300. The feeding device 300 contains a reel stand (now shown) and an infeed device 301. The reel stand supports the first roll 101r so that the first roll 101r can rotate. The infeed device 301 makes the tension and speed of the first hard sheet 101 fed from the first roll 101r uniform. The first hard sheet 101 is fed from the first roll 101r towards the pressing device 500 by means of the feeding device 300.

The second hard sheet 103 is a transparent film. The transparent film is of an elastically deformable polypropylene and is a thin film of about 0.1 mm. The second hard sheet 103 is prepared to have the same width (e.g. 1200 mm) as the soft sheet 102. The second hard sheet 103 is taken up by a winding device onto the second roll 103r. The second roll 103r is set in the feeding device 300'. The feeding device 300' contains, similar to the feeding device 300, a reel stand (not shown) and an infeed device 301'. The second hard sheet 103 is fed from the second roll 103r towards the pressing device 500 by means of the feeding device 300'.

The pressing device 500 contains a pair of pressure bonding rolls 501 and 502. The pressure bonding roll 501 is a rotary driven roll. The pressure bonding roll 502 may be a rotary driven roll or may be a roll that rotates dependently to the pressure bonding roll 501 without being rotary driven.

Between a pair of pressure bonding rolls 501 and 502 are provided nip members with predetermined intervals for allowing the passage of the laminated sheet 100. In the present embodiment, the nip members are provided with intervals of, for example, 1.0 mm.

The soft sheet 102 is brought into contact with the first hard sheet 101 on one face and with the second hard sheet 103 on the other face, which are then guided to the nip members. Thus, the first hard sheet 101, the soft sheet 102 and second the hard sheet 103 which are laminated in this order from the top are guided as such to the nip members. The first hard sheet 101, the soft sheet 102 and the second hard sheet 103 which are laminated in this order have a thickness of 1.0 mm.

To the first hard sheet 101, the soft sheet 102 and the second hard sheet 103 which are laminated is applied a predetermined amount of pressure while passing though the nip members to obtain the laminated sheet 100 having a thickness of 1.0 mm. More specifically, to the first hard sheet 101 and the second hard sheet 103, which sandwich the soft sheet 102 in the uncured state, is applied a predetermined amount of pressure in the nip members. The soft sheet 102 in the uncured state is in a temperature range of about 150 to 160° C.

The first hard sheet 101, the soft sheet 102 and the second hard sheet 103 applied with pressure are in close contact. The soft sheet 102 is cooled and completely cured while it is in the close contact, and the first hard sheet 101, the soft sheet 102 and the second hard sheet 103 are integrated to give the laminated sheet 100. Accordingly, the laminated sheet 100 can be produced, without requiring the use of adhesives and the like, by bonding the soft sheet 102 with the first hard sheet 101 and the second hard sheet 103.

The soft sheet 102, the first hard sheet 101 and the second hard sheet 103 are respectively formed of similar materials and thus are sufficiently integrated with preferable adhesiveness. The laminated sheet 100 includes the soft sheet 102 which is soft and is sandwiched by the first hard sheet 101 and the second hard sheet 103 which are hard, and thus has less warps and can keep a rigid structure even with a low thickness.

The laminated sheet 100 is taken up by the take-up roll 402 and travels to the adjusting device 600. The adjusting device 600 contains adjusting rolls 601 and 602. The adjusting roll 601 contains a driving roll which is rotary driven and a nip roll (which may be rotary driven or may rotate dependently to the driving roll without being rotary driven). The adjusting roll 602 also has similar structures. The adjusting roll 601 and the adjusting roll 602 are disposed at different heights.

In the present embodiment, the adjusting roll 601 is disposed at a position higher than the take-up rolls 402 and 403. The adjusting roll 602 is disposed at a position lower than the take-up rolls 402 and 403. Thus the laminated sheet 100 travels such that it is bent upward when passing through the adjusting roll 601 and downward when passing through the adjusting roll 602. The laminated sheet 100 passes through the adjusting rolls 601 and 602 which are disposed at different heights and thus is adjusted to have a decreased internal stress and a flat plane without warps.

<Cutting (S3)>

As shown in FIG. 6, the laminated sheet 100 which has passed through the adjusting device 600 is taken up by the take-up roll 403 and travels to the cutting devise 700. The laminated sheet 100 is cut with a cutting blade 701 of the cutting devise 700 in a rectangular shape to give the base sheet 110. Although the jigsaw puzzle of the present embodiment is cut in a rectangular shape, it is needless to say that the jigsaw puzzle may be cut in other shapes.

The base sheet 110 is formed with a first hard layer 111, a soft layer 112 and a second hard layer 113 which are integrated together. The first hard layer 111 is obtained by cutting the first hard sheet 101. The soft layer 112 is obtained by cutting the soft sheet 102. The second hard layer 113 is obtained by cutting the second hard sheet 103.

<Stamping (S4)>

As shown in FIG. 6, the base sheet 110 is stamped out with the stamping machine 800 to produce the jigsaw puzzle 1 formed with a plurality of pieces. The stamping machine 800 contains a stamping vertical blade 801 and a stamping horizontal blade 802. The stamping vertical blade 801 and the stamping horizontal blade 802 are to cut the base sheet 110 into a plurality of pieces. The base sheet 110 is cut by the stamping vertical blade 801 and the stamping horizontal blade 802, so that a male engaging member or a female engaging member is formed on each piece.

A plurality of stamping vertical blades 801 is provided with predetermined intervals so as to be approximately parallel along the vertical orientation. A plurality of stamping horizontal blades 802 is provided with predetermined intervals so as to be approximately parallel along the horizontal orientation. The base sheet 110 may be, during the process of stamping by the stamping vertical blade 801 or the stamping horizontal blade 802, placed in a frame having the matching dimensions to the base sheet 110 in order to prevent the base sheet 110 from deviating. By referring to FIGS. 7 to 10, the step of stamping of the base sheet 110 to form the jigsaw puzzle 1 is now specifically described.

As shown in FIG. 7, the base sheet 110 has the pattern printed on the surface thereof. As shown in FIG. 8(a), the stamping vertical blade 801 is brought into contact with the surface of the first hard layer 111. The stamping vertical blade 801 is, while it is contacted to the first hard layer 111, pushed downward. As shown in FIG. 8(b), the first hard layer 111 elastically deforms when the stamping vertical blade 801 is pushed with a force at or above a predetermined level. At this time, the drooped face is formed in the first hard layer 111. The stamping vertical blade 801 is further pushed and then stamps out the first hard layer 111. At this time, the sheared face and the burred face are formed in the first hard layer 111. These drooped face, sheared face and burred face constitute the first bow-shaped side face of each piece (see FIG. 4).

As shown in FIG. 8(b), the soft layer 112 elastically deforms when the stamping vertical blade 801 is pushed with a force at or above a predetermined level. At this time, the drooped face is formed in the soft layer 112. The stamping vertical blade 801 is further pushed and then stamps out the soft layer 112. At this time, the sheared face and the burred face are formed in the soft layer 112. These drooped face, sheared face and burred face constitute the second bow-shaped side face of each piece (see FIG. 4).

As shown in FIG. 8(c), the second hard layer 113 elastically deforms when the stamping vertical blade 801 is pushed with a force at or above a predetermined level. At this time, the drooped face is formed in the second hard layer 113. The stamping vertical blade 801 is further pushed and then stamps out the second hard layer 113. At this time, the sheared face and the burred face are formed in the second hard layer 113. These drooped face, sheared face and burred face constitute the third bow-shaped side face of each piece (see FIG. 4).

The stamping vertical blade 801 is stopped when the edge is slightly projected from the reverse face of the second hard layer 113. The stamping vertical blade 801 is then moved upward to be withdrawn from the base sheet 110. At this time, the sheared faces of the first hard layer 111, the soft layer 112 and the second hard layer 113 become smooth due to friction against the stamping vertical blade 801. As shown in FIG. 9, the base sheet 110 is stamped out by the stamping vertical blade 801 to be cut along the vertical orientation.

As shown in FIG. 10(a), the stamping horizontal blade 802 is brought into contact with the surface of the first hard layer 111. The stamping horizontal blade 802 is, while it is contacted to the first hard layer 111, pushed downward. As shown in FIG. 10(b), the first hard layer 111 elastically deforms when the stamping horizontal blade 802 is pushed with a force at or above a predetermined level. At this time, the drooped face is formed in the first hard layer 111. The stamping horizontal blade 802 is further pushed and then stamps out the first hard layer 111. At this time, the sheared face and the burred face are formed in the first hard layer 111. These drooped face, sheared face and burred face constitute the first bow-shaped side face of each piece (see FIG. 4).

As shown in FIG. 10(b), the soft layer 112 elastically deforms when the stamping horizontal blade 802 is pushed with a force at or above a predetermined level. At this time, the drooped face is formed in the soft layer 112. The stamping horizontal blade 802 is further pushed and then stamps out the soft layer 112. At this time, the sheared face and the burred face are formed in the soft layer 112. These drooped face, sheared face and burred face constitute the second bow-shaped side face of each piece (see FIG. 4).

As shown in FIG. 10(c), the second hard layer 113 elastically deforms when the stamping horizontal blade 802 is pushed with a force at or above a predetermined level. At this time, the drooped face is formed in the second hard layer 113. The stamping horizontal blade 802 is further pushed and then stamps out the second hard layer 113. At this time, the sheared face and the burred face are formed in the second hard layer 113. These drooped face, sheared face and burred face constitute the third bow-shaped side face of each piece (see FIG. 4).

The stamping horizontal blade 802 is stopped when the edge is slightly projected from the reverse face of the second hard layer 113. The stamping horizontal blade 802 is then moved upward to be withdrawn from the base sheet 110. At this time, the sheared faces of the first hard layer 111, the soft layer 112 and the second hard layer 113 become smooth due to friction against the stamping horizontal blade 802. As shown in FIG. 1, the base sheet 110 is stamped out by the stamping horizontal blade 802 to be also cut along the horizontal orientation, so that the jigsaw puzzle 1 is completely produced.

<Withdrawal (S5)>

The jigsaw puzzle 1 is withdrawn from the frame. Burrs formed on the jigsaw puzzle 1 are removed, if any. The jigsaw puzzle 1 is disassembled and placed in a package.

In the present embodiment, the first hard sheet 101 has the printed pattern on one face. However, the pattern may be printed on the other face. Thus, it is needless to say that one face and/or the other face may have patterns printed thereon. The second hard sheet 103 does not have a pattern printed thereon in the present embodiment, although it may have patterns on one face and/or the other face.

The various embodiments of the present invention have been described hereinabove, which do not limit the present invention. It is needless to say that various modifications can be made within the scope of the present invention without departing the spirit thereof. Each piece is not limited to the present embodiment and may have a thickness of 0.8 to 2.0 mm. The first hard layer, the second hard layer and the soft layer may have varied thickness according to the thickness of each piece as above. For example, the first hard layer and the second hard layer each may have a thickness of 0.1 to 0.2 mm, and the soft layer may have a thickness of 0.6 to 1.6 mm. It is further needless to say that the jigsaw puzzle may contain metal pieces, beads, jewels, lames and the like to improve design.

EXPLANATION OF REFERENCE NUMERALS

1 Jigsaw puzzle
10 to 50 Piece
100 Laminated sheet
101 First hard sheet
102 Soft sheet
103 Second hard sheet
200 Extrusion moulding machine
300, 300' Feeding device
401, 402, 403 Delivery roll
500 Pressing device
600 Adjusting device
700 Cutting devise
800 Stamping machine

The invention claimed is:

1. A method of manufacturing a jigsaw puzzle, the method comprising:
a first step (S1) of extruding a molten synthetic resin into a sheet shape by extrusion moulding to produce a soft sheet (102);
a second step (S2) of bonding, to the soft sheet (102), a hard sheet (101, 103) of a synthetic resin that is harder than the soft sheet to form a laminated sheet (100);
a third step (S3) of cutting the laminated sheet (100) to form a base sheet (110) having a certain size; and
a fourth step (S4) of stamping out the base sheet (110) with a stamping blade to be formed into a plurality of small pieces, wherein
the laminated sheet (100) in the second step is obtained by applying pressure to the soft sheet (102) in an uncured state before complete curing after the extrusion moulding and the hard sheet (101, 103) in order to bond the sheets together.

2. The method of manufacturing the jigsaw puzzle according to claim 1, wherein
the hard sheet (101, 103) is formed of:
a first hard sheet (101) that is bonded to one face of the soft sheet; and
a second hard sheet (103) that is bonded to the other face of the soft sheet.

3. The method of manufacturing a jigsaw puzzle according to claim 2, wherein at least one member selected from the soft sheet (102), the first hard sheet (101) and the second hard sheet (103) is a transparent or semi-transparent member allowing the passage of light.

4. The method of manufacturing the jigsaw puzzle according to claim 2, wherein the first hard sheet (101) and/or the second hard sheet (103) has a pattern printed by a rotary printing machine.

\* \* \* \* \*